UNITED STATES PATENT OFFICE.

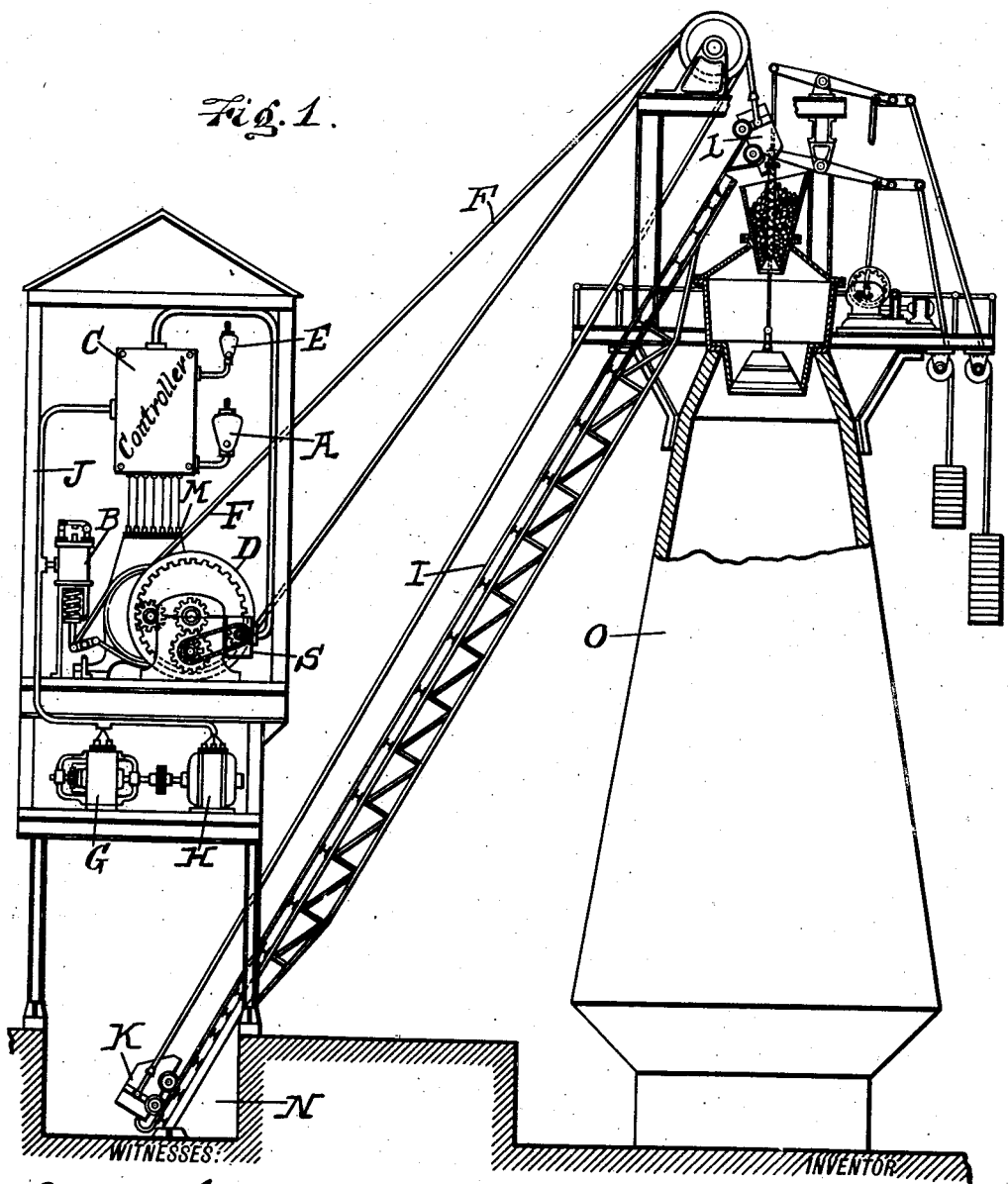

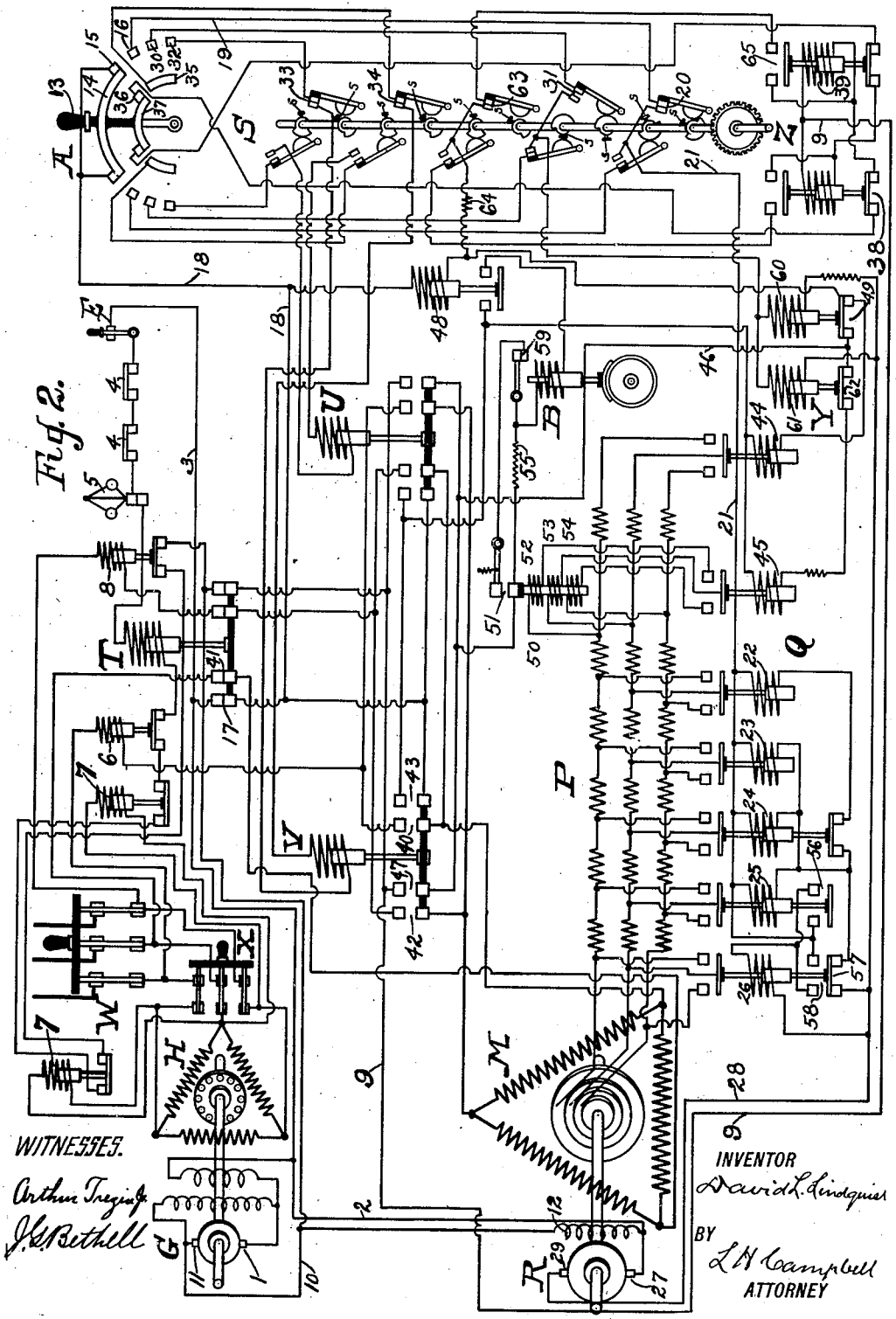

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT HOIST.

1,197,835.  Specification of Letters Patent.  Patented Sept. 12, 1916.

Application filed May 17, 1913. Serial No. 768,212.

*To all whom it may concern:*

Be it known that I, DAVID L. LINDQUIST, a subject of the King of Sweden, residing in Yonkers, in the county of Westchester and State of New York, have invented a new and useful Improvement in Alternating-Current Hoists, of which the following is a specification.

My invention relates to electric hoists, and the same is particularly adapted to a furnace or skip hoist, in which an alternating current is used for power.

An object of the invention is the provision of a novel system of electrical control for an alternating current motor by means of a direct current.

Another object of the invention is the provision of automatic and improved means for controlling an alternating current electric motor in starting, accelerating, slowing down and stopping by the use of a direct current generated in part by the motor itself.

Another object of the invention is the provision of a polyphase alternating current hoisting motor and means for preventing the operation of the said motor unless and until all of the phases are in proper condition and alive.

A further object is the provision of a novel system of automatic control for an alternating current hoisting motor in which the electro-responsive devices which control the circuits of the motor will operate in a predetermined manner independent of a rise or fall of potential in the power mains.

Other objects of the invention will appear hereinafter, the novel combinations of elements being pointed out in the annexed claims.

In a furnace or skip hoist the motor must necessarily be of large size, owing to the very heavy unbalanced load, which load ofttimes amounts to several tons. This load must be carefully handled, particularly at or near its limits of travel so as to insure that the load carrying device or skip will come to rest directly over the furnace bell in position for dumping regardless of the load or speed of the motor. This result may be effected more or less satisfactorily when the hoisting motor is a direct current machine, but where the hoist is to be operated by an alternating current motor, the desired result is much more difficult to attain. In slowing down and stopping a direct current motor, use is made of the dynamic brake effect supplied by the motor itself operating as a dynamo, but with a standard type of alternating current motor, this brake effect is lacking, since a standard type of alternating current motor will not operate as a self-exciting generator.

I purpose to couple a direct current generator to an alternating current hoisting motor; to separately excite the generator by current supplied from a motor generator; and to control the alternating current hoisting motor by means of electro-responsive devices operated exclusively by direct current generated from the two sources above mentioned. By this method I am enabled to control the main motor in accordance with its load and speed, and to overcome the many objectionable features inherent in substantially all electro-responsive devices operated by an alternating current.

In the drawings, Figure 1 represents a furnace or skip hoist containing an embodiment of the invention; Fig. 2 is a wiring diagram showing the various electrical circuits and mechanism controlled thereby.

Like reference characters denote similar parts in both figures.

Referring to Fig. 1, O represents a blast furnace which is charged with ore, limestone, coke, etc., by means of the skips K and L, which travel over the inclined tracks I. The skips K and L are both connected to opposite ends of a cable or cables F which are wrapped about a winding drum D operated by an alternating current motor M. The latter is housed in a power house J located at the lower end of the incline which contains the controlling mechanism comprising a controller C, brake B, automatic stop motion switch S geared to the winding drum shaft, motor generator set H and G, master switch A and emergency switch E. The stop motion switch S being geared to the main motor operated in synchronism therewith, and each switch arm of the switch S is operated by a corresponding cam, so that the desired operation of the switch arms may be effected from the cam shaft by a separate or collective adjustment of the cams about the cam or operating shaft, such as indicated by the set screws s. The skips L and K travel over the incline from a charging pit N to the top of the furnace, the loaded skip ascending while the empty skip is descending. To the rear of the motor M is a direct current generator R (Fig. 2) which is coupled to and rotates with the motor.

Referring to Fig. 2, I show, in addition to the parts already pointed out, the main line switch W, a switch X for connecting the motor generator set in circuit, a potential switch T, reversing switches U and V, speed controlling resistance P, in the motor circuit, load magnet switches Y, non-interference magnet switches Z and speed controlling switches Q, together with other parts which go to make up the system of control.

Assuming the main line switch W and switch X to be in closed position, as shown, the motor H will run at full speed and bring the generator G up to normal constant potential. Both relays 7 will be energized from the mains to maintain their contact closed and thereby establish a circuit from the generator G to the holding magnet of potential switch T provided all of the phases are intact and alive. This circuit may be traced from the generator brush 1, through the wires 2, and 3, emergency switch E, limit switches 4—4, governor switch 5, holding magnet of the potential switch T, contacts of overload relay 6, contacts of relays 7, 7, contacts of overload relay 8, and by the wire 10, to the generator brush 11. The potential switch will close its contacts and maintain them closed providing the main line potential does not drop excessively and the skip does not overrun its limits of travel or attain excessive speed and provided there is no overload on the motor and that all of the main line phases are alive and intact with both of the relays 7 in closed position, and the emergency switch is not disturbed. The generator R has its field 12 excited from the generator G by way of the conductors 2 and 10.

The operation of the system is as follows: The operator moves the handle 13 of the master switch A in a right hand direction until the contact segment 14 bridges the contacts 15 and 16 and the segment 37 bridges the contacts 35 and 36. This operation closes the circuit for the accelerating magnets 22, 23, 24 and 25 across the armature of generator R, and may be traced from the brush 27, wires 2 and 3, contacts 17, wire 18, contacts of switch A, wire 19, stop motion switch contacts 20, wire 21, windings of switches 22, 23, 24 and 25, and by wire 28 to the brush 29. Since the motor M and generator R are at rest at this time, the accelerating magnets are not energized to operate their contacts. The master switch lever is next further moved in a right hand direction until the contact segment 14 engages the contact 30. This effects no immediate result since the stop motion switch contacts 31 are open at this time. The master switch is now moved to its extreme right hand position with the contact segment in engagement with the contact 32. A circuit is now closed from the generator G, through the master switch contact 32, stop motion contacts 33, solenoid of reversing switch V, stop motion contacts 34, contacts 35, and 36, of the master switch, lower contacts 38 of one of the non-interference magnets Z, winding 39, and by the wires 9, to the brush 11 of the generator G. The reversing switch V now closes its contacts and establishes a circuit from the mains by way of the contacts 40 and 42 of the reversing switch and contacts 41 of the potential switch to the stator of the motor. The contacts 43 and 47 of the reversing switch are closed at the same time, and establish a circuit from the generator G to the accelerating magnets 44 and 45, through the contacts controlled by the load magnets Y. The accelerating magnets 44 and 45 now successively operate their contacts and close the rotor circuit of the motor M through the resistance P. A parallel circuit is also closed to the solenoid of the auxiliary brake magnet 48 one branch of which includes the contacts 49 of one of the load magnets Y, and the other branch includes the resistance 64, stop motion contacts 63, contacts 65, solenoid 39 to the generator G by the conductor 9. The magnet 48 operates to close a circuit to the brake B through the resistance 55. Due to this resistance in the brake circuit the brake cannot lift and the motor cannot start unless and until this resistance first be removed. This is effected by means of a safety magnet 50 containing a plurality of windings such as 52, 53, and 54, each one of which is connected in the rotor circuit of the motor by the operation of the accelerating magnet 45. If for some reason any of the phases of the rotor or stator circuit are open-circuited, the auxiliary brake magnet 50 will not have sufficient power to close its contacts 51. If the phases are in proper condition all of the windings such as 52, 53 and 54 are excited and act together to effect the closing of the contacts 51. From this it is seen that the brake will not lift and consequently the motor cannot start notwithstanding the fact that its circuit may be closed, unless all of the motor phases are complete. Assuming such to be the case, the contacts 51 close and the brake is connected through the brake controlled contacts 59 and contacts of the auxiliary brake magnet 48 across the armature of the generator G. The brake now lifts and the motor accelerates to slow speed with the greater part of the resistance P in the rotor circuit. During the acceleration of the motor, the generator R gradually builds up a potential, and, since this generator is connected to the accelerating magnets 22, 23, 24 and 25, the latter close their contacts in successive order gradually to cut out or short circuit the resistance P and permit the motor to run up to speed. As soon as the accelerating magnet 24 has closed its upper contacts and opened its lower contacts, the circuit to the accelerating magnet 22 is broken and the same drops back. As soon as the accelerating magnet 25 closes its lower contacts 56, the final accelerating magnet 26 receives current and operates to close its upper contacts and thereby short circuit the entire resistance P. The closing of the final accelerating magnet open circuits the accelerating magnets 22, 23, 24 and 25 at the contacts 57 and establishes a self holding circuit for the final accelerating magnet at the contacts 58. The windings of magnets 22, 23, 24, and 25, no longer receive current and will remain cool. The hoist now runs at full speed with short-circuited rotor.

It will be observed that the lifting of the brake effected an opening of the contacts 59, thereby reinserting the resistance 55 in circuit with the brake winding. The brake remains in operated position nevertheless since this resistance permits sufficient current to pass to maintain the brake in released position once it has operated, but the same current will not be sufficient initially to operate the brake to released position. The resistance 55 thus performs a threefold function: first, to prevent the brake from lifting unless all of the motor phases are alive; second, to cut down the current consumed by the brake after the same has been operated, in order to economize current; and third, to prevent the magnet winding of the brake becoming overheated during the operation of the hoist.

It will be further observed that the operation of the accelerating magnet 22 will effect the deënergization of the safety magnet 50, and the same will permit its contacts 51 to open which effects no result at this time, since the brake is in lifted position and the resistance 55 has already been placed in series with the brake magnet by the operation of the brake itself.

As the ascending loaded skip approaches the top of the incline, the stop motion switch S opens the contacts 20 which open circuits the conductor 21 common to the accelerating magnets 22, 23, 24, 25 and 26, and the greater part of the resistance P is reinserted into the rotor circuit, which obviously reduces the speed of the motor. Shortly after this takes place, the stop motion switch contacts 31 close and thereby establish a circuit to the windings of the load magnets Y, from the generator R. This circuit may be traced from the generator brush 29, wire 28, magnet windings 60 and 61 of the load magnets in parallel, contacts 31 of the stop motion switch, contacts 30 and 15 of the master switch, and by wires 18, 3 and 2 to the generator brush 27. The load magnets now separate their contacts to open circuit the magnets of accelerating magnets 44 and 45, and the same open their contacts and open-circuit the rotor of the motor. The auxiliary brake magnet 48 is not deënergized by the operation of the load magnet 60, since its circuit is completed through another path, as before pointed out, said path including the resistance 64 and contacts 63 and 65 and the magnet winding 39. The speed of the hoist immediately falls off and likewise the potential of the generator R. Now, since the load magnets are operated by current from this generator, it follows that the dying current in the load magnet windings soon becomes so weak that the magnet 60 drops its core and short circuits the contacts 49. A circuit from the generator G is now closed through these contacts to the accelerating magnet 44 and the latter operates to close the rotor circuit through all of the resistance P and to permit the motor to take current from the line. If the load conditions are such that the speed of the motor continues to fall off even though its circuit be closed to the main line, the potential of the generator R likewise becomes less, until it eventually permits the load magnet 61 to drop its contacts 62, thereby closing a circuit to the winding of accelerating magnet 45 and giving the motor full starting torque with a portion of the resistance P cut out of circuit. Should the speed of the motor increase to about one third of full speed, the augmented potential of the generator R will cause the load magnet 61 to operate and deënergize the accelerating magnet 45, thereby inserting more resistance in the rotor circuit and reducing the torque of the motor. Should the speed increase to substantially four tenths of full speed, the load magnet 60 operates to effect the opening of accelerating magnet 44 to open circuit the rotor of the motor which further reduces the motor torque. From the above it can readily be seen that the load magnets Y will automatically operate to cause the hoist to slow down to a predetermined speed and maintain that speed independently of the load. The hoist continues to move at this predetermined speed until the skip approaches within a few feet of the charging point over the mouth of the furnace. At this time the stop motion switch contacts 63 are opened. The auxiliary brake magnet 48 now has to receive its current by way of the contacts 49 of the load magnet 60 and should for any reason the speed of the hoist be above substantially four tenths of full speed, the load magnet 60 opens its contacts thereby open circuiting the winding of the auxiliary brake magnet 48 and causing the latter to open the brake circuit and apply the brake to stop the hoist. As soon as the hoist stops or substantially reduces its speed, the load magnets drop their contacts thereby again releasing the brake and permit the accelerating magnets 44 and 45 again to close the rotor circuit and allow the motor to move at very slow speed. Just as the ascending skip reaches its upper limit of travel the stop motion contacts 33 and 34 simultaneously open thereby open circuiting both sides of the reversing switch magnet circuit causing the reversing switch to open its contacts and thereby cut off all current supply to the motor and brake and the hoist comes to rest, one skip being at the top of the furnace and the other skip at the loading pit.

After the lower skip has been loaded or charged the same is hoisted by reversing the direction of movement of the master switch which energizes the reversing switch U instead of the reversing switch V and the hoist operates just as before except that the direction of rotation of the motor is reversed.

It will be observed that the non-interference magnets or relays Z prevent a simultaneous energization of both reversing switches. The lower contacts of each of these relays are in series with the operating magnets of a corresponding reversing switch so that when one reversing switch is energized to close its contacts it is impossible to close a circuit to the operating magnet of the companion reversing switch so that under no conditions can both reversing switches simultaneously be in closed position. Furthermore the non-interference magnets or relays Z prevent a reversal of the hoist unless and until the loaded skip has substantially reached its upper limit of travel and discharged its load. This is due to the fact that the operation of a reversing switch such as the switch V establishes a self holding circuit for the magnet 39 of the non-interference relay Z, said circuit being traced from the direct current main 2, wire 3, contacts 17 of the potential switch T, wire 18, solenoid of auxiliary brake magnet 48, resistance 64, stop motion contacts 63, contacts 65 of switch Z, magnet 39, and by the wire 9 to the direct current main 10. As long as the contacts 63 remain closed, and these contacts will remain closed until the hoist substantially reaches its limit of travel, the reversing switch U cannot be operated from the master switch, since its circuit will be opened at the lower contacts of the energized switch Z. This applies to the normal operation of the hoist.

If for any extraordinary reason, such as in case of emergency, the operator desires to reverse the hoist or to stop the same at any point in its travel, he merely opens the emergency switch E, thereby effecting the opening of the potential switch T, and all parts, including the non-interference magnet switches Z return to deënergized position, ready for a subsequent operation of the hoist in either direction of travel.

During the operation of the hoist, the motor generator set H, G, operates continuously, and, while I have illustrated the same as comprising a squirrel cage induction motor and a compound wound direct current generator, it is obvious that almost any type of motor generator or current rectifier could just as well be used. The generator R is preferably a shunt wound machine with constantly and separately excited field, so that its potential will vary almost exactly as its speed varies.

I am aware that it has been proposed to control an alternating current motor by means of current generated by a direct connected direct current generator, but such arrangement is inadequate, since the direct current is not available until the hoist has acquired speed and therefore some of the electro-responsive devices such as the potential and reversing switches and the brake must be operated by an alternating current, which is objectionable for many reasons. Then again a self excited direct current machine will not always generate until its speed exceeds a certain critical value, and not even then under some conditions, hence the controlling current is apt to be uncertain and sometimes fail altogether. With the arrangement herein shown and described, the generator which furnishes direct current for the main motor speed controlling device is separately excited, and by having a constant field, will generate the instant its armature begins to rotate.

A valuable feature of the invention lies in the fact that the potential supplied to the various electro-responsive devices or switches is substantially independent of that of the main or power line, since the speed of the alternating current motor generator set H, G, and consequently the potential of the direct current generator G will be constant regardless of any fluctuation in voltage of the power mains. The speed of the motor H is dependent upon the number of poles it contains and the frequency of the current supplied to it from the mains, providing, of course, its load does not vary to any great extent. Since the load on the motor H is very moderate under any and all conditions, it follows that its speed will remain substantially constant even though the voltage of the main line varies. By reason of this feature I am enabled to secure a uniform operation throughout the controlling system independently of the main line voltage which feature is obviously of signal merit over a system of control in which a variation of line potential is able to modify or alter the entire operation, so that if the various devices of the system be set or adjusted for a predetermined or standard voltage, they will be uncertain in their operation, should the voltage vary and consequently the operation of the hoisting motor and skip will be uncertain and erratic, which of course is most undesirable.

The motor H and generators G and R may be small in size since the generated current required is very moderate and is only used in the magnet windings of the various electro-responsive devices. Furthermore the potential may also be low so as to obviate the danger that is always associated with high voltage and particularly high voltage alternating current.

It is obvious that those skilled in the art could readily make various changes in the system as shown without departing from the spirit or scope of my invention, hence I desire not to be limited to the precise arrangement and construction of parts herein set forth.

What I claim is:—

1. In a skip hoist, an alternating current motor for operating the hoist, a main line circuit to the motor, electro-responsive devices for controlling the motor circuit, a constant speed dynamo for supplying current to said controlling devices, speed controlling devices for the motor, and means operated by said motor for controlling said motor speed controlling devices.

2. In a skip hoist, an alternating current motor for operating the hoist, a main line circuit to the motor, electro-responsive devices for controlling the motor circuit, a dynamo operating continuously by power from the main line for supplying current to said controlling devices, speed controlling devices for the motor, and means operated by the motor for controlling said motor speed controlling devices.

3. In a skip hoist, an alternating current motor, a main line circuit to the motor, electro-responsive devices for controlling the motor circuit, a continuously operating dynamo operated by power from the main line for supplying direct current at constant potential to said controlling devices, speed controlling devices for the motor, and means dependent upon the speed of the motor for controlling said motor speed controlling devices.

4. In a skip hoist, an alternating current motor for operating the hoist, a main line circuit to the motor, electro-responsive devices for controlling the motor circuit, a constantly running dynamo operated by power from the main line for supplying direct current at constant potential to said controlling devices, speed controlling devices for the motor, and a direct current dynamo driven by said motor for supplying current to said motor speed controlling devices.

5. In a skip hoist, a polyphase motor for operating the hoist, a brake for the motor, and means for preventing the release of the brake unless all of the phases are alive.

6. In a skip hoist, a polyphase motor for operating the hoist, a brake for the motor, an electro-responsive device having a magnet winding in each phase of the motor circuit, and means controlled by said device for preventing the release of the brake unless all of the phases are alive.

7. In a skip hoist, an alternating current motor for operating the hoist, a polyphase circuit for said motor, a magnet winding in each phase of the motor circuit, a brake for the motor, and means controlled by the phase relation in said magnet windings for preventing the operation of the brake.

8. In a skip hoist, an alternating current motor for operating the hoist, a polyphase circuit for said motor, a magnet winding in each phase of the rotor of the motor, contacts controlled by said magnet windings, an electro-magnetic brake for the motor, and means controlled by said contacts for controlling a circuit to the magnet windings of said brake whereby the brake is prevented from releasing and the motor from operating unless all of the motor phases are alive.

9. In a skip hoist, a motor for operating the hoist, a polyphase circuit to the motor stator, a magnet having a plurality of windings each of which is in one phase of the rotor circuit, and means controlled by said magnet for preventing the motor from being started unless all of the rotor phases are intact.

10. In a skip hoist, a motor for operating the hoist, a polyphase circuit for the motor, a magnet having a winding in each phase of the motor circuit, a brake for the motor, means controlled by said magnet for preventing the release of the brake unless all of the phases are intact, and means for rendering said magnet inoperative after the motor has started.

11. In a skip hoist, a motor for operating the hoist, a polyphase circuit for the motor, a magnet having a winding in each phase of the motor circuit, a brake for the motor, means controlled by said magnet for preventing the release of the brake unless all of the phases are intact, and means controlled by the speed of the motor for short circuiting the windings of said magnet.

12. In a skip hoist, a motor for operating the hoist, a polyphase circuit for the motor, a magnet having a plurality of windings each winding being connected in a separate phase of the motor circuit, and means controlled by said magnet for preventing the operation of the motor until all of the windings of said magnet receive current of a predetermined strength.

13. In a skip hoist, a hoisting motor, an alternating current supply circuit for the motor, a direct current generator driven by said motor, a resistance in the motor circuit, electro-responsive devices operated by current from said generator for controlling said resistance, a magnet switch for controlling the circuit of said electro-responsive devices, and means operated by the motor near the limit of travel of the hoist for permitting said electro-responsive devices to insert the resistance in the motor circuit to reduce the speed of the motor and to close a circuit to the magnet winding of said magnet switch to effect the opening of the motor circuit.

14. In a skip hoist, a hoisting motor, an alternating current supply circuit for the motor, a direct current generator driven by said motor, a resistance in the motor circuit, electro-responsive devices operated by current from said generator for controlling said resistance, a magnet switch for controlling the circuit of said electro-responsive devices, means operated by the motor near the limit of travel of the hoist for permitting the electro-responsive devices to insert the resistance in the motor circuit to reduce the speed of the motor and to close a circuit from the direct current generator to the magnet winding of said magnet switch to effect the opening of the motor circuit and then after to permit said magnet switch to effect the closing of the motor circuit depending upon the speed and load of the motor.

15. In a skip hoist, a motor for operating the hoist, a resistance in the rotor circuit of the motor, a switch adapted to control the rotor circuit, electroresponsive devices for controlling said resistance, a dynamo connected to run with the motor and adapted to supply current to said electro-responsive devices in accordance with the speed of the motor, an independent source of current supply for said rotor circuit switch, and means operated by the motor when the hoist approaches its limits of travel in either direction for controlling said electro-responsive devices and said rotor circuit switch to effect a slow down of the motor in accordance with its speed and load.

16. In a skip hoist, a motor for operating the hoist, a resistance in the rotor circuit of the motor, a switch adapted to control the rotor circuit, electroresponsive devices for controlling said resistance, a separately excited direct current dynamo connected to run with the motor and adapted to supply current to said electro-responsive devices in accordance with the speed of the motor, an independent source of current supply for said rotor circuit switch, and means operated by the motor when the hoist approaches its limits of travel in either direction for controlling said electro-responsive devices and said rotor circuit switch to effect a slow down of the motor in accordance with its speed and load.

17. In a skip hoist, a motor for operating the hoist, electro-responsive reversing switches for the motor, a separate relay for each switch having its magnet winding connected in series with the magnet of each of the reversing switches, and manually closed contacts associated with each of the said relays, the contacts of one relay being connected in series with the magnet winding of the other relay, whereby the magnet winding of one reversing switch is open-circuited at the contacts of one of said relays upon the energization of the magnet winding of the other reversing switch to prevent the simultaneous operation of both of said reversing switches.

18. In a skip hoist, a motor for operating the hoist, electro-responsive reversing switches for the motor, relays connected in series with the magnet winding of each switch, normally closed relay contacts, the contacts of one relay including a circuit in series with the other relay and its connected reversing switch, whereby the energization of one reversing switch open circuits the magnet winding of its companion reversing switch at the contacts of one of the relays, means for establishing a self holding circuit for one of the relays to maintain the latter in operated position, and means for interrupting the said self holding circuit so as to deënergize the said last-named relay and permit the subsequent operation of either of said reversing switches.

19. In a skip hoist, a motor for operating the hoist, electro-responsive reversing switches for the motor, relays connected in series with the magnet winding of each switch, normally closed relay contacts, the contacts of one relay including a circuit in series with the other relay and its connected reversing switch, whereby the energization of one reversing switch open-circuits the magnet winding of its companion reversing switch at the contacts of one of the relays, means for establishing a self holding circuit for one of the relays to maintain the latter in operated position, and means controlled by the motor for interrupting the said self holding circuit so as to deënergize the said last named relay and permit the subsequent operation of either of the reversing switches.

20. In a skip hoist, an alternating current motor for operating the hoist, electro-responsive devices for controlling the operation of the motor, a direct current dynamo driven by said motor and adapted to supply current to said electro-responsive devices, and means operated by the motor for controlling said electro-responsive devices to stop the skip at a predetermined point in its travel regardless of its load and speed.

21. In a skip hoist, an alternating current motor for operating the hoist, electro-responsive devices for controlling the operation of the motor, a direct current dynamo driven by said motor and adapted to supply current to said electro-responsive devices, and automatic means operated by the motor for controlling said electro-responsive devices to stop the skip at a predetermined point in its travel regardless of its load and speed.

22. In a skip hoist, an alternating current hoisting motor, a direct current dynamo operating in synchronism with said motor, motor speed controlling devices operated by current from said dynamo, and means controlled by the motor for effecting the operation of said speed controlling devices to stop the skip invariably at the same point.

23. In a skip hoist, an alternating current hoisting motor, a direct current dynamo operating in synchronism with said motor, motor speed controlling devices operated by current from said dynamo, and means automatically operated by the motor when the skip reaches a predetermined point in its travel for effecting a slow down and stop of the skip at an exact landing.

24. In a skip hoist, a motor for operating the hoist, reversing switches for the motor, a separate circuit for the magnet windings of the reversing switches, and a relay having its winding in one of said circuits and its contacts controlling the other of said circuits, and a self holding circuit for said relay winding adapted to be closed by the operation of the relay.

25. In a skip hoist, a motor for operating the hoist, reversing switches for the motor, a separate circuit for the magnet windings of the reversing switches, a relay having its winding in one of said circuits and its contacts controlling the other of said circuits, a self holding circuit for said relay winding adapted to be closed by the operation of the relay, and a switch controlled by the motor in said self holding circuit.

In testimony whereof I have signed my name to this specification in the presence of two subscribing witnesses.

DAVID L. LINDQUIST.

Witnesses:
WALTER C. STRANG,
JAMES G. BETHELL.